(12) United States Patent
Yi et al.

(10) Patent No.: US 9,501,291 B2
(45) Date of Patent: *Nov. 22, 2016

(54) METHOD AND SYSTEM FOR PROVIDING HYBRID-SHUTDOWN AND FAST STARTUP PROCESSES

(71) Applicant: Hewlett-Packard Development Company, L.P., Houston, TX (US)

(72) Inventors: Hyejung Yi, Sunnyvale, CA (US); Vicky He, Sunnyvale, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 159 days.

This patent is subject to a terminal disclaimer.

(21) Appl. No.: 14/528,851

(22) Filed: Oct. 30, 2014

(65) Prior Publication Data
US 2015/0052343 A1    Feb. 19, 2015

Related U.S. Application Data

(63) Continuation of application No. 12/230,822, filed on Sep. 5, 2008, now Pat. No. 8,914,653.

(51) Int. Cl.
*G06F 1/32* (2006.01)
*G06F 9/44* (2006.01)

(52) U.S. Cl.
CPC .............. *G06F 9/4418* (2013.01); *G06F 1/32* (2013.01); *G06F 1/3203* (2013.01);
(Continued)

(58) Field of Classification Search
CPC ...................... G06F 1/3203; G06F 1/32; G06F 1/3234; G06F 1/3246; G06F 1/3206; G06F 9/4418; Y02B 60/186
See application file for complete search history.

(56) References Cited

U.S. PATENT DOCUMENTS 5,978,923 A    11/1999    Kou
6,209,088 B1    3/2001    Reneris
(Continued)

FOREIGN PATENT DOCUMENTS

CN    1504859 A    6/2004
JP    H05-333962 A    12/1993
(Continued)

OTHER PUBLICATIONS

Advanced Configuration and Power Interface Specification, Revision 1.0b; Intel et al.; Feb. 2, 1999.
(Continued)

*Primary Examiner* — Jaweed A Abbaszadeh
*Assistant Examiner* — Terrell Johnson
(74) *Attorney, Agent, or Firm* — Mannava & Kang, P.C.

(57) ABSTRACT

In an example, in a method for providing a shutdown process for a computer system including an operating system (OS), basic input/output system (BIOS) firmware may capture a request from the OS to hardware of the computer system to enter into a hibernate state. In addition, the BIOS firmware may determine whether a hybrid-shutdown process is in process and in response to a determination that the hybrid-shutdown process is in process, may turn off the computer system instead of entering the computer system into the hibernate state.

15 Claims, 3 Drawing Sheets

(52) U.S. Cl.
CPC ........... *G06F 1/3206* (2013.01); *G06F 1/3234* (2013.01); *G06F 1/3246* (2013.01); *Y02B 60/186* (2013.01)

(56) References Cited

U.S. PATENT DOCUMENTS

| | | | |
|---|---|---|---|
| 6,691,238 B1 | 2/2004 | Forbes et al. | |
| 6,754,817 B2 | 6/2004 | Khatri et al. | |
| 6,760,850 B1 | 7/2004 | Atkinson et al. | |
| 7,089,433 B2 | 8/2006 | Chaiken et al. | |
| 7,131,011 B2 | 10/2006 | Westerinen et al. | |
| 7,162,629 B2 | 1/2007 | Zimmer et al. | |
| 7,360,045 B2 | 4/2008 | Maezawa | |
| 7,574,590 B2 | 8/2009 | Moore et al. | |
| 7,620,784 B2 | 11/2009 | Panabaker | |
| 7,730,330 B1 | 6/2010 | Fleischmann et al. | |
| 7,971,081 B2 | 6/2011 | Cooper et al. | |
| 8,914,653 B2 * | 12/2014 | Yi | G06F 9/4418 713/310 |
| 2004/0003223 A1 | 1/2004 | Fortin et al. | |
| 2004/0034765 A1 | 2/2004 | James | |
| 2004/0103345 A1 | 5/2004 | Dunstan | |
| 2005/0044348 A1* | 2/2005 | O'Connell | G06F 9/4418 713/1 |
| 2005/0055591 A1 | 3/2005 | Cho | |
| 2005/0086551 A1 | 4/2005 | Wirasinghe et al. | |
| 2005/0246565 A1* | 11/2005 | Koarai | G06F 9/4418 713/323 |
| 2006/0059380 A1 | 3/2006 | Kimura | |
| 2007/0149256 A1* | 6/2007 | Burgan | H04W 52/0254 455/574 |
| 2009/0119527 A1* | 5/2009 | Kim | G06F 1/3203 713/323 |
| 2010/0115315 A1 | 5/2010 | Davis et al. | |
| 2013/0031388 A1* | 1/2013 | Sakarda | G06F 1/3287 713/320 |

FOREIGN PATENT DOCUMENTS

| | | |
|---|---|---|
| JP | H07-191786 A | 7/1995 |
| JP | 2005-316855 A | 11/2005 |
| JP | 2006-079468 A | 3/2006 |
| JP | 2006-512650 A | 4/2006 |
| JP | 2007-148633 A | 6/2007 |
| JP | 2008-090435 A | 4/2008 |
| WO | WO-2005/071531 A1 | 8/2005 |

OTHER PUBLICATIONS

Compaq/Intel/Microsoft/Phoenix/Toshiba, "Advanced Configuration and Power Interface Specification," Revision 2.0c, Aug. 25, 2003, pp. 1-488 (518 pages total), Available at: <http://www.acpi.info/DOWNLOADS/ACPIspec-2-0c.pdf>.

Document Reference Citation: Developing a Dual Boot Windows Embedded Media Experience Device; Kevin Otnes; Microsoft Corp, Dec. 2004; 1-14.

GB Office Action, Application No. GB1104404.7, Date of Issuance: Mar. 13, 2012.

Hat Monster, "Summary of ACPI System Level (Sx) states," Nov. 1, 2003, pp. 1-11, Ars Technica, Ars OpenForum, Available at: <arstechnica.com/civis/viewtopic.php?f=8&t=354552>.

Hibernation (computing) in Wikipedia, the free encyclopedia, Aug. 30, 2008, pp. 1-3, Available at: <en.wikipedia.org/w/index.php?>.

Office Action, German Application No. 112008004006.0, Date of Issuance: Sep. 15, 2014, pp. 1-11.

Power Management, Computer Science, The University of Texas at Austin, Apr. 23, 2008, pp. 1-5.

Ruhezustand, Wikipedia, Die freie Enzyklopadie, Aug. 30, 2008, pp. 1-3, English Translation: Hibernation (computing), pp. 1-5, Available on Jul. 24, 2014 at: < http://en.wikipedia.org/wiki/Hibernate_(OS_feature)>, Wikimedia Foundation, Inc.

Ying-Wen Bai and Huang-Te Hsu, "Design and Implementation of an Instantaneous Turning-on Mechanism for PCs," IEEE Transactions on Consumer Electronics, 53, 2007, 4, pp. 1595-1601, IEEE.

* cited by examiner

METHOD AND SYSTEM FOR PROVIDING HYBRID-SHUTDOWN AND FAST STARTUP PROCESSES

CROSS REFERENCE TO RELATED APPLICATION(S)

This application claims priority to and is a Continuation Application of U.S. patent application Ser. No. 12/230,822, filed on Sep. 5, 2008, entitled "METHOD AND SYSTEM FOR PROVIDING HYBRID-SHUTDOWN AND FAST STARTUP PROCESSES," the disclosure of which is hereby incorporated by reference in its entirety.

BACKGROUND

Personal computer (PC) marketing surveys show that one of the most common customer requests for a PC manufacturer is faster PC startup. Currently, most PCs are pre-loaded with Windows operating system (OS) and application software programs. Typically 1.5 to 2 minutes are needed to complete a full boot process from a Power-Off state (S5 in Advanced Configuration and Power Interface (ACPI)). When an anti-virus software is running, the full boot startup process may be longer.

Windows Vista currently offers the Sleep mode (S3 in ACPI), Hibernate mode (S4 in ACPI), and Hybrid-Sleep mode power management features. These power management features allow PCs to resume quickly to the last state before power-off, each offering different power consumption level, resume time, and stability. For example, the S3 Sleep mode saves data (such as the last system state context data) in a system memory and places the system in a stand-by mode. The computer system can be woken up and used almost immediately. However, in the S3 Sleep mode, the power must not be turned off. Once out of power, the system will have to start again using a full boot process from the S5 Power-Off state.

The S4 Hibernate mode saves data (such as the last system state context date) in a hard disk drive as opposed to the system memory. When the computer system needs to be used again, the system boots up using the last system state context data. Boot up from the S4 Hibernate mode takes longer than from the S3 Sleep mode.

These power management features all consume power even when the PC is not in use. In addition, with the exception of the S4 Hibernate mode, these power management features do not work if a user turns off the PC or unplugs the PC's power cord. While the S4 Hibernate mode works if a laptop power cord is unplugged, the battery power consumption of the S4 Hibernate mode is still higher than the S5 Power-Off state.

SUMMARY

A method for providing hybrid-shutdown and fast startup processes for a computer system, which includes an operating system (OS), includes enabling a user to enter an instruction to start a hybrid-shutdown process, passing the instruction to an application that starts the hybrid-shutdown process, and requesting the OS to prepare for a hibernate state by saving a current system state as a last system state. The OS requests hardware to hibernate at the end of the hibernate processing. The method further includes capturing the hardware request from the OS to hibernate, turning off the computer system instead of entering into the hibernate state, and, upon a next power-on, performing a fast resume process from the hibernate state using the saved last system state to provide full functionality of the computer system.

A system for providing hybrid-shutdown and fast startup processes includes a button enabling a user to enter an instruction to start the hybrid-shutdown process. The button being located on a computer. The system further includes an application that, upon receiving the instruction, requests an operating system (OS) to prepare for a hibernate state by saving a current system state as a last system state. The OS requests hardware to hibernate at the end of the hibernate processing. The system further includes basic input/output system (BIOS) firmware configured to capture the hardware request from the OS to hibernate. The BIOS firmware turns off the computer instead of entering into the hibernate state. Upon a next power-on, the OS performs a fast resume process from the hibernate state using the saved last system state to provide full functionality of the computer.

A computer readable medium provides instructions for providing hybrid-shutdown and fast startup processes for a computer system that includes an operating system (OS). The instructions are executed on the computer system and include enabling a user to enter an instruction to start a hybrid-shutdown process, passing the instruction to an application that starts the hybrid-shutdown process, and requesting the OS to prepare for a hibernate state by saving a current system state as a last system state. The OS requests hardware to hibernate at the end of the hibernate processing. The instructions further include capturing the hardware request from the OS to hibernate, turning off the computer system instead of entering into the hibernate state, and, upon a next power-on, performing a fast resume process from the hibernate state using the saved last system state to provide full functionality of the computer system.

BRIEF DESCRIPTION OF THE DRAWINGS

Exemplary embodiments of the method and system for providing hybrid-shutdown and fast startup processes will be described in detail with reference to the following figures, in which like numerals refer to like elements, and wherein.

DETAILED DESCRIPTION

Figure 1:
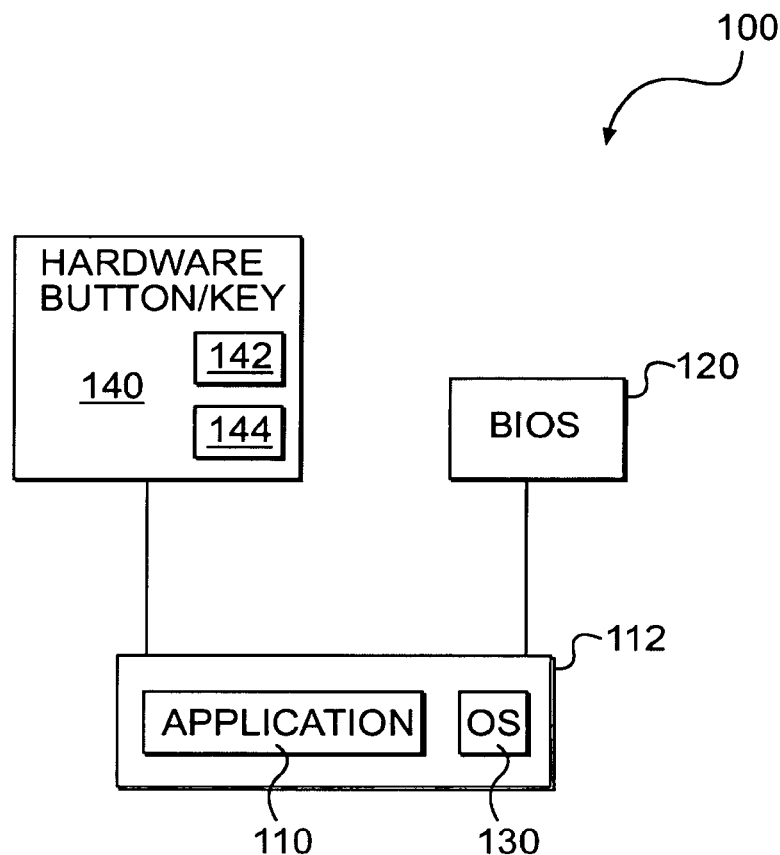
FIG. 1 illustrates an exemplary system for providing hybrid-shutdown and fast startup processes.

Before one or more embodiments of the method and system for providing hybrid-shutdown and fast startup processes are described in detail, one skilled in the art will appreciate that the method and system for providing hybrid-shutdown and fast startup processes are not limited in their application to the details of construction, the arrangements of components, and the arrangement of steps set forth in the following detailed description or illustrated in the drawings. The method and system for providing hybrid-shutdown and fast startup processes are capable of other embodiments and of being practiced or being carried out in various ways. Also, the phraseology and terminology used herein is for the purpose of description and should not be regarded as limiting.

FIG. 1 illustrates an exemplary system 100 for providing hybrid-shutdown and fast startup processes. The system 100 includes basic input/output system (BIOS) firmware 120 that identifies and initiates component hardware when first powered on. Specifically, the BIOS firmware 120 prepares and configures hardware of a computer, such as a personal computer (PC), so that software programs stored on various media can load, execute, and assume control of the computer. The BIOS firmware 120 can be stored in a memory device.

The system 100 further includes a hardware button 140 that is capable of receiving an instruction, i.e., input, from a user to start a hybrid-shutdown process. The hardware button 140 may be a hybrid-shutdown button 142 or a hybrid-shutdown key 144. The event of the hardware button 140 being pressed is referred to as a button event.

The system 100 further includes an operating system (OS) 130 and a software application or program 110, such as a Windows application, that are linked to the hardware button 140. During initialization, the BIOS firmware 120 configures the hardware button 140 using corresponding hardware signaling, referred to as Advanced Configuration and Power Interface (ACPI) interrupt, and software programming so that the OS 130 can receive a notification of the button event.

During initialization of the OS 130, the OS 130 may start the application 110. The application 110 registers with the OS 130 so that when the hardware button 140 is pressed the OS 130 notifies the application 110 of the button event. The application 110 also may be automatically started by the OS 130 when the hardware button 140 is pressed.

After receiving the button event notification from the OS 130, the application 110 starts the hybrid-shutdown process by requesting the OS 130 to prepare for a hibernate state and save a current system state as a last system state on. The last system state may be saved, for example, on a hard disk drive. OS 130 may optionally enable wake-up events during the hibernate processing. At the end of the hibernate processing, the OS 130 requests computer hardware to hibernate.

The BIOS firmware 120 captures, i.e., intercepts, the hibernate request from the OS 130 to the computer hardware. After determining that the hybrid-shutdown process is in progress, i.e., that the hardware button 140 has been pressed, the BIOS firmware 120 configures the computer hardware to turn off the computer instead of entering into the hibernate state. The optional wake-up events are disabled, allowing the hybrid-shutdown process to save more power than the hibernate state. If, however, the BIOS firmware 120 determines that the hardware button 140 has not been pressed and the hybrid-shutdown process is not in progress, the computer enters into the hibernate state.

Upon the next power-on, the BIOS firmware 120 performs a power-on-self-test (POST) and passes control to the OS 130. The OS 130 checks if there has been any hardware configuration change since a previous power-off. If there is no hardware configuration change, the OS 130 uses the saved last system state to perform a fast resume process from the hibernate state to provide full functionality of the computer. If there are changes in hardware configuration, the OS 130 performs a full system boot.

The exemplary system 100 for providing hybrid-shutdown and fast startup processes allows a computer to quickly return to its last state before power-off instead of going through time consuming hardware enumeration and configuration during a normal full system boot. The fast resume time can be, for example, less than 30 seconds. The system 100 enables fast system startup regardless of the number of pre-loaded software program as long as there is no hardware configuration change since the previous power-off. Therefore, PC manufacturers can freely add software without compromising the boot time. The system 100 is integrated into the computer's power-off path, thus delivering a true power-off state and the lowest power consumption level to satisfy the industry's green PC initiative.

Figure 2:
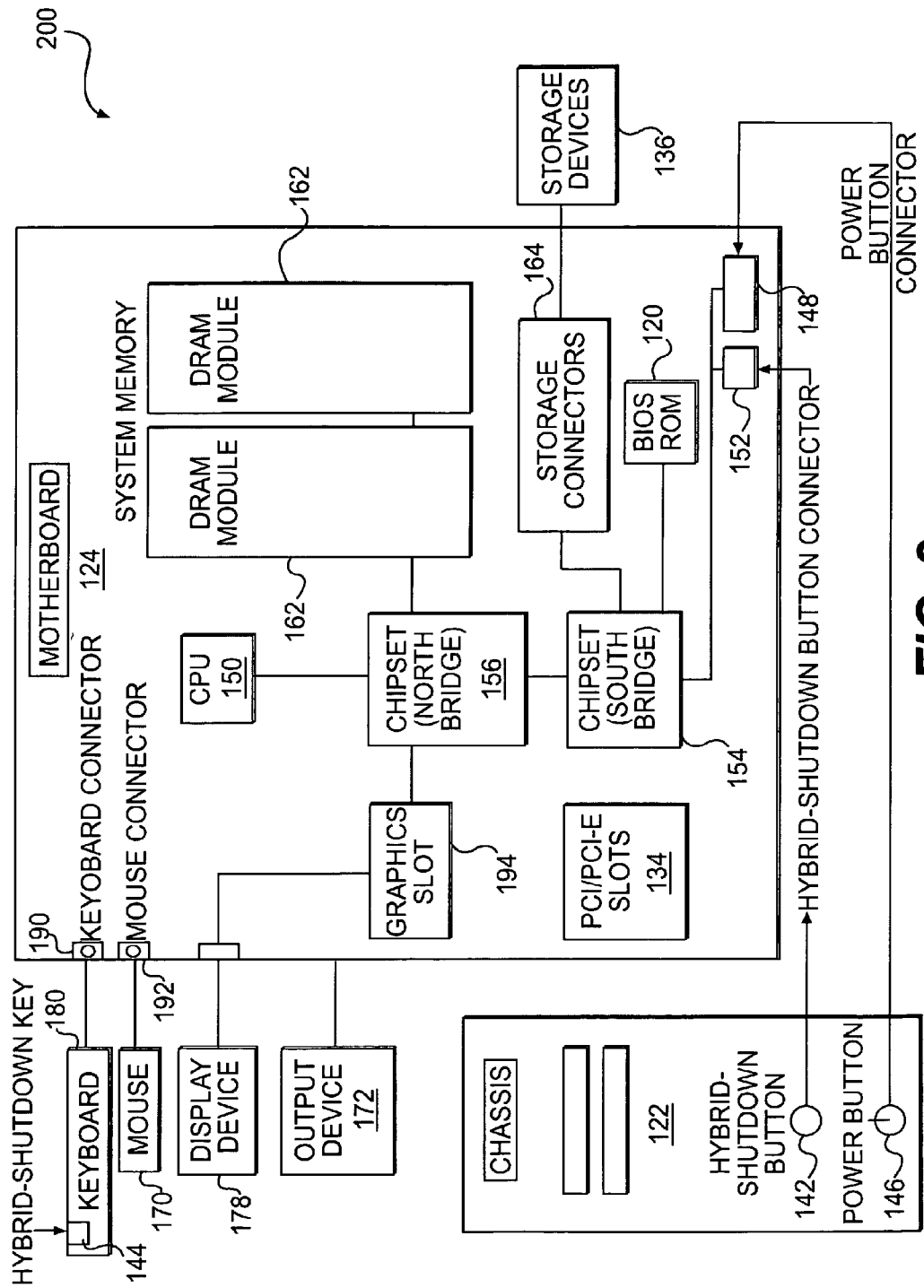
FIG. 2 illustrates exemplary hardware components of a computer that may be used in connection with the system for providing hybrid-shutdown and fast startup processes.

FIG. 2 illustrates exemplary hardware components of a computer 200 that may be used in connection with the system 100 for providing hybrid-shutdown and fast startup processes. The computer 200 may include a connection with a network such as the Internet or other type of computer or telephone network. The computer 200 includes a motherboard 124 that is located inside a chassis 122.

The hybrid-shutdown button 142 is located on the chassis 122 close to a regular power button 146, for example. One skilled in the art will appreciate that the hybrid-shutdown button 142 may be located anywhere on the chassis 122. The hybrid-shutdown button 142 may be a re-defined power button, a modified power button, or a general purpose input/output (GPIO)-based hybrid-shutdown button. The hybrid-shutdown button 142 is connected to a processor 150 through a hybrid-shutdown button connector 152. The power button 146 is connected to the processor 150 through a power button connector 148.

The processor 150, such as a central processing unit (CPU), is connected to system memories 162. A north bridge (NB) chip 156 may be used to control the system memories 162. The NB chip 152 and a south bridge (SB) chip 154 are part of a chipset. The chipset contains major microcontroller chips and may be used to control computer devices. The chipset 154, 156 is referred to as the NB chip 156 and the SB chip 154 based on the positioning of the two chips on the motherboard 124. The computer 200 may alternatively contain only one chip by further integrating the NB chip 156 and the SB chip 154. The system memories 162 may include random access memory (RAM) or similar types of memory.

The computer 200 also includes secondary storage devices 136, which are connected to the processor 150 through storage connectors 164. The secondary storage devices 136 may include a hard disk drive, floppy disk drive, CD-ROM drive, or other types of non-volatile data storage, and may correspond with various databases or other resources. The hard disk drive may be used to store the OS 130, the application 110, and the last system state.

The processor 150 may execute instructions to perform the method steps described herein. For example, the processor 150 may execute instructions to automatically start the application 110 or to notify the application 110 to request the OS 130 to prepare for a hibernate state when the hardware button 140 is pressed. These instructions may be stored in the system memories 162, the secondary storage devices 136, or optionally received from the Internet or other network.

The computer 200 also includes input devices, which may be any device for entering data into the computer 200, such as a keyboard 180, keypad (not shown), cursor-control device, such as a mouse 170, touch-screen (possibly with a stylus) (not shown), or microphone (not shown). The keyboard 180 may be a personal system/2 (PS/2) keyboard or a universal serial bus (USB) keyboard. The hybrid-shutdown key 144, which may be a custom-designed key, is located on the keyboard 180 to allow the user to enter the instruction to start a hybrid-shutdown process. The keyboard 180 and mouse 170 are connected to the motherboard 124 through a keyboard connector 190 and a mouse connector 192, respectively.

The computer 200 also includes peripheral component interconnect (PCI) slots and/or PCI Express (PCI-E) slots (collectively 134) for attaching peripheral devices to the computer motherboard. The computer 200 further includes a display device 178, which may be any type of device for presenting visual image, such as, for example, a computer monitor, flat-screen display, or display panel. The display device 178 is connected to the processor 150 through a graphics slot 194, which is referred to as external graphics. Alternatively, the display device 178 may be connected to the processor 150 through a direct connection to the NB chip 156 without a graphics slot, which is referred to as integrated graphics.

The computer 200 further includes an output device 172, which may be any type of device for presenting data in hard copy format, such as a printer, and other types of output devices including speakers or any device for providing data in audio form. The computer 200 can possibly include multiple input devices, output devices, and display devices. The exemplary computer 200 may be a desktop computer, a laptop computer, and other types of computers.

Although the computer 200 is depicted with various components, one skilled in the art will appreciate that the computer 200 can contain additional or different components. In addition, although aspects of an implementation consistent with the system for providing hybrid-shutdown and fast startup processes are described as being stored in system memories, one skilled in the art will appreciate that these aspects can also be stored on or read from other types of computer program products or computer-readable media, such as secondary storage devices, including hard disks, floppy disks, or CD-ROM; a signal embodied in a carrier wave from the Internet or other network; or other forms of RAM or ROM. The computer-readable media may include instructions for controlling the computer 200 to perform a particular method.

Figure 3:
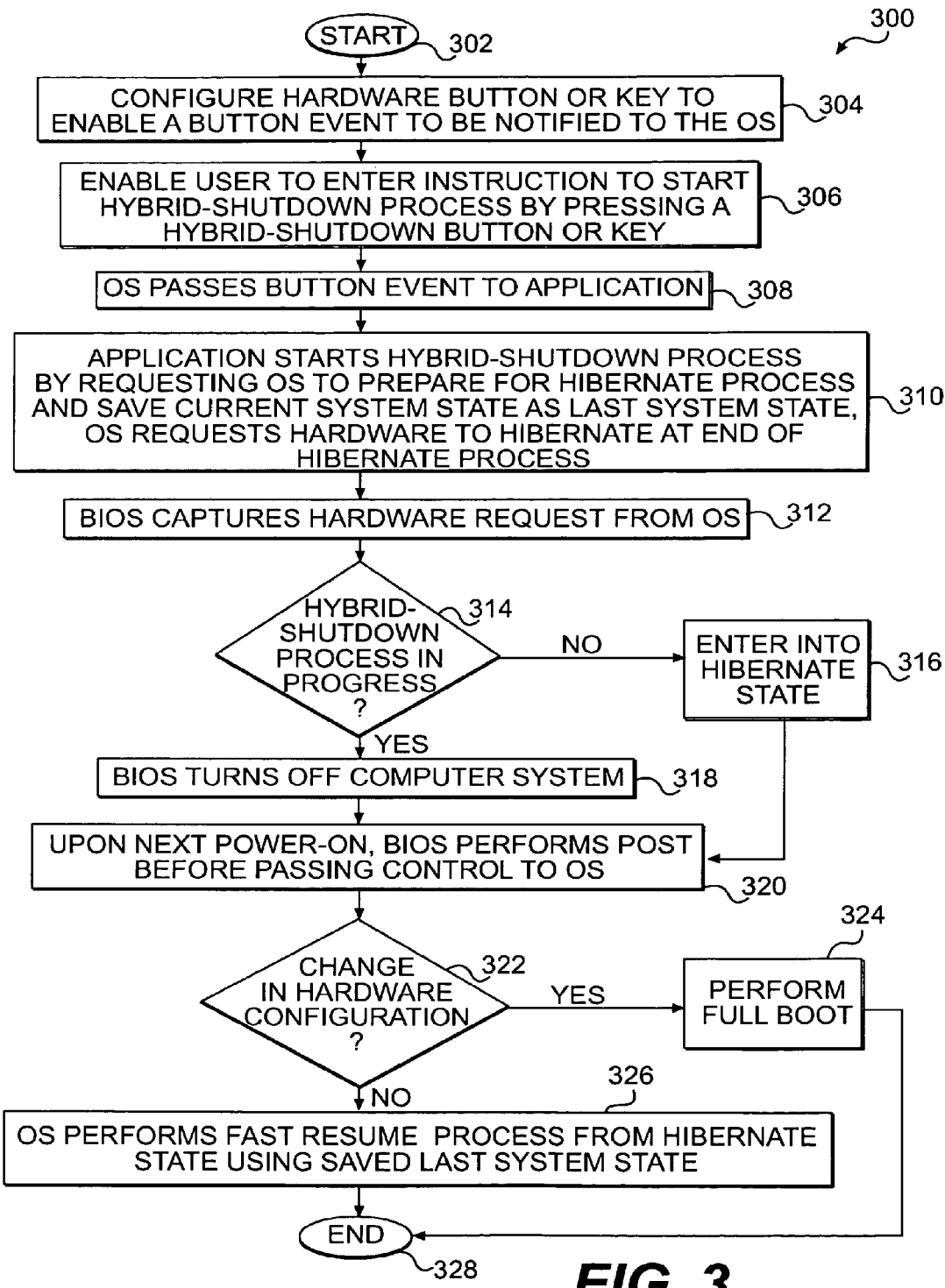
FIG. 3 is a flow chart illustrating an exemplary method for providing hybrid-shutdown and fast startup processes.

FIG. 3 is a flow chart illustrating an exemplary method 300 for providing hybrid-shutdown and fast startup processes for the computer 200. The method 300 starts 302 by configuring the hardware button 140 to enable the button event to be notified to the OS 130 using corresponding hardware signaling and software programming (block 304). The method 300 enables a user to enter an instruction to start the hybrid-shutdown process by, for example, pressing the hybrid-shutdown button 142 or the hybrid-shutdown key 144 located on the keyboard 180 (block 306). The OS 130 passes the button event to the application 110 (block 308). The application 110 starts the hybrid-shutdown process by requesting the OS 130 to prepare for a hibernate state and save the current system state as the last system state on a hard disk drive (block 310). The OS 130 requests the computer hardware to hibernate at the end of the hibernate processing (block 310).

The BIOS firmware 120 captures, i.e., intercepts, the hardware request from the OS 130 to hibernate (block 312). The BIOS firmware 120 determines if the hybrid-shutdown process is in process (block 314). If no, the computer 200 enters into the hibernate state (block 316). If the hybrid-shutdown process is in process, the BIOS firmware 120 configures the computer hardware to turn off the computer 200 instead of entering into the hibernate state (block 318).

Upon the next power-on, the BIOS firmware 120 performs POST before passing control to the OS 130 (block 320). The OS 130 determines if there is any change in hardware configuration since the previous power-off (block 322). If yes, the OS 130 performs a full system boot (block 324). If there is no hardware configuration change, the OS 130 performs a fast resume process from the hibernate state using the saved last system state to provide full functionality of the computer 200 (block 326). The method 300 ends at 328.

In the foregoing detailed description, systems and methods in accordance with embodiments of the method and system for providing hybrid-shutdown and fast startup processes are described with reference to specific exemplary embodiments. Accordingly, the present specification and figures are to be regarded as illustrative rather than restrictive. The scope of the method and system for providing hybrid-shutdown and fast startup processes is to be further understood by the numbered examples appended hereto, and by their equivalents.

Further, in describing various embodiments, the specification may present a method and/or process as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process should not be limited to the performance of their steps in the order written, and one skilled in the art can readily appreciate that the sequences may be varied and still remain within the spirit and scope of the various embodiments.

What is claimed is:

1. A method for providing a shutdown process for a computer system, the computer system including an operating system (OS), the method comprising:
    capturing, by basic input/output system (BIOS) firmware, a request from the OS to hardware of the computer system to enter the computer system into a hibernate state;
    determining, by the BIOS firmware, whether a hybrid-shutdown process is in process; and
    in response to a determination that the hybrid-shutdown process is in process, turning off the computer system instead of entering the computer system into the hibernate state.

2. The method of claim 1, further comprising:
    in response to a determination that the hybrid-shutdown process is not in process, entering the computer system into the hibernate state.

3. The method of claim 1, wherein determining whether a hybrid-shutdown process is in process further comprises determining that the hybrid-shutdown process is in process in response to an instruction to start the hybrid-shutdown process being received in the computer system and an instruction to start the hybrid-shutdown process being passed to an application that starts the hybrid-shutdown process.

4. The method of claim 3, wherein, following receipt of the instruction to start the hybrid-shutdown process, the OS is requested to prepare for the hibernate state by saving a current system state as a last system state, said method further comprising:
    upon a next power-on, performing, by the BIOS firmware, a fast resume process using the saved last system state.

5. The method of claim 4, further comprising:
    performing, by the BIOS firmware, a POST request upon the next power-on and prior to passing control the OS.

6. The method of claim 5, further comprising:
    determining, by the OS, whether a change in hardware configuration occurred since the previous time the computer system was turned off;

in response to a determination that a change in hardware configuration has occurred, performing, by the OS, a full system boot; and in response to a determination that a change in hardware configuration has not occurred, performing, by the BIOS firmware, the fast resume process using the saved last system state.

7. The method of claim 1, further comprising:
receiving an instruction to start the hybrid-shutdown process.

8. The method of claim 7, wherein receiving the instruction further comprises identifying that a hybrid-shutdown button that is associated with the hybrid-shutdown process has been activated.

9. The method of claim 8, wherein the hybrid-shutdown button is one of a re-defined power button, a modified power button, and a general purpose input/output (GPIO)-based hybrid-shutdown button.

10. A computer system comprising:
hardware;
an operating system (OS); and
basic input/output system (BIOS) firmware, wherein the BIOS firmware is to:
  capture a request from the OS to the hardware to enter the computer system into a hibernate state;
  determine that a hybrid-shutdown process is in process; and
  in response to the determination that the hybrid-shutdown process is in process, turning off the computer system instead of entering the computer system into the hibernate state.

11. The computer system of claim 10, further comprising:
a button associated with initiating the hybrid-shutdown process;
a storage device on which is stored an application that is to request the OS to prepare for the hibernate state in response to activation of the button, wherein the application is to request the OS to prepare for the hibernate state by saving a current system state as a last system state; and wherein the BIOS firmware is to, upon a next power-on, perform a fast resume process using the save last system state.

12. The computer system of claim 11, wherein the button is one of a re-defined power button, a modified power button, and a general purpose input/output (GPIO)-based hybrid-shutdown button.

13. The computer system of claim 10, wherein the OS is to determine whether a change in hardware configuration has occurred since the previous time the computer system was turned oft wherein upon the next power-on, the BIOS firmware is to pass control to the OS, and wherein the OS is to perform a full system boot in response to a determination that a change in hardware configuration has occurred.

14. A non-transitory computer readable medium on which is stored machine readable instructions for providing a shutdown process, wherein the machine readable instructions, when executed by a computer system, are to cause the computer system to:
capture, by basic input/output system (BIOS) firmware, a request from an operating system (OS) of the computer system to hardware of the computer system to enter into a hibernate state;
determine, by the BIOS firmware, whether a hybrid-shutdown process of the computer system is in process, and
in response to a determination that the hybrid-shutdown process of the computer system is in process, turn off the computer system instead of entering the computer system into the hibernate state.

15. The non-transitory computer readable medium of claim 14, wherein the machine readable instructions are further to cause the processor to:
execute an application that is to request the OS to prepare for the hibernate state in response to activation of a button by saving a current system state as a last system state; and
upon a next power-on, perform, by the BIOS firmware, a fast resume process using the saved last system state.

* * * * *

UNITED STATES PATENT AND TRADEMARK OFFICE
CERTIFICATE OF CORRECTION

PATENT NO. : 9,501,291 B2  
APPLICATION NO. : 14/528851  
DATED : November 22, 2016  
INVENTOR(S) : Hyejung Yi et al.

Page 1 of 1

It is certified that error appears in the above-identified patent and that said Letters Patent is hereby corrected as shown below:

In sheet 2 of 3, reference numeral 190, Line 1, delete "KEYOBARD" and insert -- KEYBOARD --, therefor.

In Column 8, Line 11 approx., in Claim 13, delete "oft" and insert -- off, --, therefor.

Signed and Sealed this  
Eighth Day of May, 2018

Andrei Iancu  
*Director of the United States Patent and Trademark Office*